(12) United States Patent
Watanabe et al.

(10) Patent No.: US 11,342,769 B2
(45) Date of Patent: May 24, 2022

(54) CONTROL DEVICE

(71) Applicant: DENSO CORPORATION, Aichi-pref. (JP)

(72) Inventors: Tetsuya Watanabe, Kariya (JP); Yuki Tachibana, Kariya (JP); Hiroki Fujii, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/508,597

(22) Filed: Jul. 11, 2019

(65) Prior Publication Data

US 2019/0334371 A1  Oct. 31, 2019

Related U.S. Application Data

(63) Continuation of application No. PCT/JP2018/000658, filed on Jan. 12, 2018.

(30) Foreign Application Priority Data

Jan. 13, 2017  (JP) .............................. JP2017-004404

(51) Int. Cl.
*F02N 11/08*  (2006.01)
*H02J 7/00*  (2006.01)
(Continued)

(52) U.S. Cl.
CPC ............ *H02J 7/0047* (2013.01); *B60L 58/13* (2019.02); *B60W 10/08* (2013.01);
(Continued)

(58) Field of Classification Search
CPC ............. F02N 11/0814; F02N 11/0818; F02N 11/0825; F02N 11/0862; F02N 11/0866;
(Continued)

(56) References Cited

U.S. PATENT DOCUMENTS

| 6,936,934 B2* | 8/2005 | Morimoto ................. B60K 6/54 |
| | | 307/9.1 |
| 7,805,264 B2* | 9/2010 | Mizuno ................. H01M 10/48 |
| | | 702/64 |

(Continued)

FOREIGN PATENT DOCUMENTS

| JP | 2004-072927 A | 3/2004 |
| JP | 2006258070 A * | 9/2006 |

(Continued)

OTHER PUBLICATIONS

Mar. 20, 2018 International Search Report issued in International Application No. PCT/JP2018/000658.

*Primary Examiner* — Michael A Kessler
(74) *Attorney, Agent, or Firm* — Oliff PLC (57) ABSTRACT

A control device comprises an acquisition unit that acquires a current to or from the battery and a voltage of a battery, a calculation unit that calculates an internal resistance of the battery based on the current and the voltage when the regenerative power generation is performed by a rotary electric machine, and a permission determination unit that determines whether to permit an automatic stop of an engine depending on whether restarting of the engine is enabled based on power running drive of the rotary electric machine. The calculation unit calculates a value of the internal resistance each time the regenerative power generation or the power running drive is performed before the engine enters an automatic stop state. The permission determination unit determines whether to permit the automatic stop based on a latest value of the internal resistance among values of the internal resistance calculated by the calculation unit.

9 Claims, 7 Drawing Sheets

(51) Int. Cl.
  *B60W 10/08* (2006.01)
  *H02J 7/14* (2006.01)
  *H02J 7/18* (2006.01)
  *B60L 58/13* (2019.01)
  *B60W 10/26* (2006.01)

(52) U.S. Cl.
  CPC ...... *F02N 11/0825* (2013.01); *F02N 11/0866* (2013.01); *H02J 7/1446* (2013.01); *H02J 7/18* (2013.01); *B60W 10/26* (2013.01); *F02N 2200/061* (2013.01); *F02N 2200/062* (2013.01); *H01M 2220/20* (2013.01)

(58) Field of Classification Search
  CPC ......... F02N 2200/061; F02N 2200/062; F02N 2200/063; F02N 2200/064; F02N 2200/065; B60W 2510/244; B60W 20/13; B60W 20/14; G01R 31/3842
  See application file for complete search history.

(56) References Cited

U.S. PATENT DOCUMENTS

| | | | |
|---|---|---|---|
| 8,536,872 B2* | 9/2013 | Ueda | G01R 31/3842 324/430 |
| 9,793,722 B2* | 10/2017 | Tamura | B60L 1/00 |
| 2007/0193796 A1* | 8/2007 | Yamaguchi | F02N 11/0866 180/125 |
| 2007/0200567 A1* | 8/2007 | Mizuno | G01R 31/3648 324/430 |
| 2009/0295399 A1* | 12/2009 | Ueda | F02N 11/0825 324/429 |
| 2010/0269776 A1 | 10/2010 | Mizuno | |
| 2013/0317729 A1* | 11/2013 | Mitsuyama | B60R 16/03 701/113 |

FOREIGN PATENT DOCUMENTS

| | | | |
|---|---|---|---|
| JP | 2010031740 A | * | 2/2010 |
| JP | 2016-008519 A | | 1/2016 |

* cited by examiner

| SOC VARIATION | FIRST CORRECTION COEFFICIENT |
|---|---|
| 10%~ | 1.050 |
| 5%~10% | 1.024 |
| -5%~5% | 1.000 |
| -5%~-10% | 0.976 |
| -10%~ | 0.950 |

Tb1

| TEMPERATURE VARIATION | SECOND CORRECTION COEFFICIENT |
|---|---|
| +2℃~ | 0.990 |
| +1℃~2℃ | 0.995 |
| -1℃~1℃ | 1.000 |
| -1℃~-2℃ | 1.035 |
| -2℃~ | 1.082 |

CONTROL DEVICE

CROSS-REFERENCE TO RELATED APPLICATION

The present application is a continuation application of International Application No. PCT/JP2018/000658, filed on Jan. 12, 2018, which claims priority to Japanese Patent Application No. 2017-004404 filed on Jan. 13, 2017. The contents of these applications are incorporated herein by reference in their entirety.

BACKGROUND

Technical Field

The present disclosure relates to a control device applied to a power supply system.

Background Art

As a power supply system, there is a system in which a battery is connected to a rotary electric machine capable of both power running drive and regenerative power generation.

SUMMARY

In the present disclosure, provided is a control device as the following. The control device including an acquisition unit, a calculation unit, and a permission determination unit. The calculation unit calculates a value of an internal resistance each time an regenerative power generation is performed before an engine enters an automatic stop state; and the permission determination unit determines whether to permit an automatic stop of the engine based on a latest value of the internal resistance among values of the internal resistance calculated by the calculation unit.

BRIEF DESCRIPTION OF THE DRAWINGS

The above object, other objects, characteristics, and advantages of the present disclosure are further clarified by the following detailed description with reference to the attached drawings. The drawings are as follows.

DETAILED DESCRIPTION OF THE PREFERRED EMBODIMENTS

Conventionally, as an on-vehicle power supply system mounted on a vehicle, there is a system in which a battery is connected to a rotary electric machine (e.g., a motor generator, such as ISG) capable of both power running drive and regenerative power generation. This on-vehicle power supply system is configured such that power generated by the rotary electric machine is supplied to thereby charge the battery, and such that when the rotary electric machine performs power running drive, necessary power is supplied from the battery.

In batteries, it is known that their internal resistance values vary depending on the degree of degradation of the batteries. Specifically, if a battery is degraded, the internal resistance value increases, and the power that can be supplied becomes smaller. Accordingly, the control device calculates an internal resistance value of the battery from the current to or from the battery and the voltage of the battery, and determines the possibility of providing functionality based on the calculated internal resistance value. Since the internal resistance value may vary depending on input/output patterns, such as input/output power and input/output time, the control device calculates an internal resistance value for each input/output pattern to thereby increase the accuracy of the internal resistance value.

For example, to determine whether an engine 10 can be restarted, the control device calculates an internal resistance value based on the current etc. detected in the input/output pattern at the time of the last restart. Then, the control device determines whether restart is possible next time based on the calculated internal resistance value. More specifically, the control device determines whether power required for restart can be supplied.

However, the internal resistance value of the battery may vary depending on the state change of the battery during a period from restart of the engine 10 until the engine 10 enters an automatic stop state. For example, it is considered that regenerative power generation and/or power running drive are performed during a period from restart of the engine 10 until the engine 10 enters an automatic stop state, so that the state of charge (SOC) of the battery varies. Similarly, it is considered that the temperature of the battery varies depending on the heat from the engine 10 etc., outside air temperature, and the like during a period from restart of the engine 10 until the engine 10 enters an automatic stop state. The internal resistance values also vary depending on changes in the SOC and temperature of the battery. Therefore, when whether next restart is possible is determined based on the internal resistance value calculated at the time of the last restart, the internal resistance value may have varied during a period from restart of the engine 10 until the engine 10 enters an automatic stop state, and there is a possibility that whether restart is possible cannot be accurately determined.

The present disclosure was made in light of the above circumstances. A main object of the present disclosure is to provide a control device that can improve the accuracy of determination of an automatic stop permission.

The first disclosure relates to a control device that is applied to a power supply system mounted in a vehicle in which an engine is automatically stopped and restarted, wherein the power supply system includes a battery connected to a rotary electric machine that has a function of a regenerative power generation function and a function of a power running drive, and the rotary electric machine being connected to an output shaft of the engine, the control device including: an acquisition unit that acquires a current to or from the battery and a voltage of the battery, a calculation unit that calculates an internal resistance of the battery based on the current to or from the battery and the voltage of the battery when the regenerative power generation or the power running drive is performed by the rotary electric machine, and a permission determination unit that determines whether to permit an automatic stop of the engine depending on whether restarting of the engine is enabled based on the power running drive of the rotary electric machine; wherein the calculation unit calculates a value of the internal resistance each time the regenerative power generation or the power running drive is performed before the engine enters an automatic stop state; and the permission determination unit determines whether to permit an automatic stop of the engine based on a latest value of the internal resistance among values of the internal resistance calculated by the calculation unit.

In the vehicle, regenerative power generation is performed, for example, at every deceleration opportunity. In this case, regarding a latest value of the internal resistance among internal resistance values calculated during regenerative power generation before the engine enters an automatic stop state, the change factors (time, temperature, state of charge, etc.) from the time of calculation are expected to be smaller than those of the internal resistance value calculated during power running drive. Moreover, the change factors from the time of calculation, of the latest internal resistance value, are expected to be smaller than those of the internal resistance value calculated during previous regenerative power generation. That is, the detection accuracy of the latest internal resistance value is expected to be higher than that of the internal resistance value calculated during power running drive, and that of the internal resistance value calculated before the latest internal resistance value. Therefore, determination accuracy can be improved by determining automatic stop permission based on the latest internal resistance value.

The second disclosure is that one or more conditions of the automatic stop include a speed of the vehicle reaching a predetermined value or less; and the permission determination unit determines whether to permit an automatic stop of the engine based on, as the latest internal resistance value, a value of the internal resistance calculated by the calculation unit during regenerative power generation performed before the speed of the vehicle reaches the predetermined value or less during deceleration of the vehicle.

When the speed of the vehicle reaches a predetermined value or less, one or more conditions of the automatic stop can be satisfied. Therefore, regenerative power generation performed before the speed of the vehicle reaches a predetermined value or less during deceleration of the vehicle can be considered to be regenerative power generation immediately before the engine enters an automatic stop state. The change factors of the internal resistance value calculated during this regenerative power generation are expected to be smallest compared with internal resistance values calculated in other opportunities. The detection accuracy can be increased by using this value as the latest internal resistance value.

The third disclosure is that the control device comprises an error determination unit that determines whether the latest value of the internal resistance has a predetermined amount or more of error with respect to a value of the internal resistance value calculated before the latest value of the internal resistance; and when it is determined that the latest value of the internal resistance has the predetermined amount or more of error, the permission determination unit fails to permit an automatic stop of the engine based on the latest value of the internal resistance.

When the latest internal resistance value has a predetermined amount or more of error, there is a possibility of erroneous detection, which is not suitable for permission determination. Therefore, when the latest internal resistance value has a predetermined amount or more of error, an automatic stop is not permitted based on the latest internal resistance value.

The fourth disclosure is that the control device comprises a polarization determination unit that determines whether a polarization has occurred in the battery during execution of the regenerative power generation; and when it is determined that the polarization has occurred during execution of the regenerative power generation when the latest value of the internal resistance is calculated, the permission determination unit fails to permit an automatic stop of the engine based on the latest value of the internal resistance.

When polarization occurs in the battery, even if an internal resistance value is calculated based on the current and voltage during this regenerative power generation, the error is likely to increase, which is not suitable for permission determination. Accordingly, when polarization occurs in the battery, it is decided not to use the internal resistance value calculated during this regenerative power generation for deciding whether to permit automatic stop.

The fifth disclosure is that the permission determination unit determines whether to permit an automatic stop of the engine based on a plurality of values of the internal resistance including the latest value of the internal resistance.

Determination accuracy can be improved because determination is made based on a plurality of internal resistance values.

The sixth disclosure is that the permission determination unit calculates an average value or smoothed value of the plurality of values of the internal resistance, and determines whether to permit an automatic stop of the engine based on the calculated average value or smoothed value.

Determination accuracy can be improved because determination is made based on the average value or smoothed value of a plurality of internal resistance values.

The seventh disclosure is that the permission determination unit corrects a value of the internal resistance used for determination of whether to permit an automatic stop of the engine, based on a state change of the battery from the time of calculation of the value of the internal resistance to a present time, and determines whether to permit an automatic stop of the engine based on the corrected value of the internal resistance.

Even if the error of the internal resistance value increases due to the changes in the state of the battery, correction can be made to reduce the error of the internal resistance value. Determination accuracy can be thereby improved.

The eighth disclosure is that the control device comprises a state determination unit that determines whether a state change of the battery from the time of calculation of the value of the internal resistance used for determination of whether to permit an automatic stop of the engine to a present time is equal to or more than a predetermined amount; and when it is determined that the state change of the battery is equal to or more than the predetermined amount, the permission determination unit fails to permit an automatic stop of the engine.

If the error of the internal resistance value increases due to the changes in the state of the battery, automatic stop is uniformly not permitted. This makes it possible to reliably avoid the situation in which restart cannot be achieved due to power shortage after automatic stop.

The ninth disclosure is that the state determination unit determines that the state change of the battery is equal to or more than the predetermined amount based on at least one of the following:

an elapsed time from the time of calculation of the internal resistance value used for determination of the automatic stop permission to the present time is equal to or more than a predetermined time;

a temperature change of the battery is equal to or more than a predetermined temperature; and a change in a state of charge of the battery is equal to or more than a predetermined amount.

When a predetermined time or more is elapsed, when the temperature changes by a predetermined temperature or more, or when the state of charge changes by a predetermined amount or more, there is a possibility that the internal resistance value varies by a predetermined amount or more, and permission cannot be appropriately determined. Therefore, in such a case, it is regarded that the state change of the battery is equal to or more than a predetermined amount.

First Embodiment

An embodiment that embodies the present disclosure is described below based on the drawings. The present embodiment embodies an on-vehicle power supply system that is mounted on a vehicle running using an engine 10 (internal combustion engine) as a driving source, and that supplies power to various devices of the vehicle. The engine 10 has a function of the so-called idling stop, and is configured to be able to execute automatic stop and restart.

Figure 1:
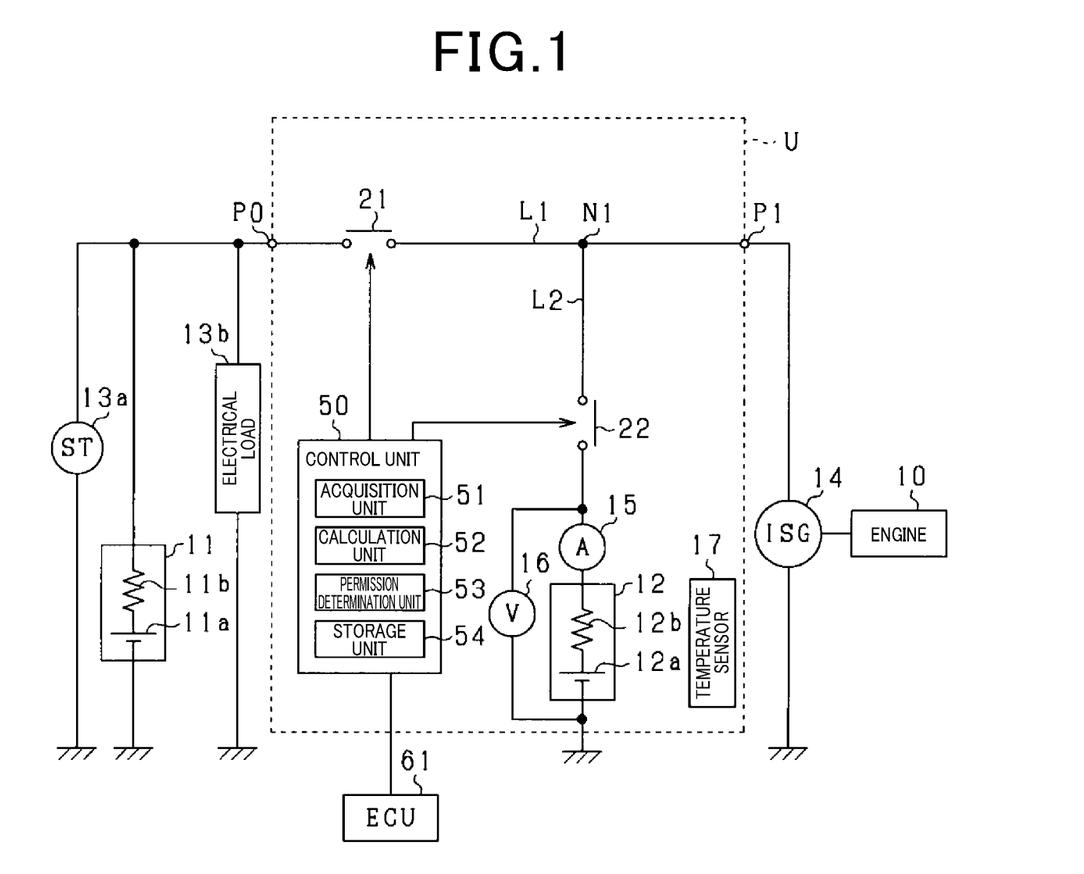
FIG. 1 is an electric circuit diagram showing a power supply system.

As shown in FIG. 1, this power supply system is a double power supply system having a lead battery 11 and a lithium ion battery 12, and each of the batteries 11 and 12 can supply (discharge) power to a starter 13a and an electrical load 13b. Further, each of the batteries 11 and 12 can be charged by a rotary electric machine 14. Moreover, each of the batteries 11 and 12 can supply (discharge) power to the rotary electric machine 14. In this system, the lead battery 11 and the lithium ion battery 12 are connected in parallel to the rotary electric machine 14, and the lead battery 11 and the lithium ion battery 12 are connected in parallel to the starter 13a and the electrical load 13b.

The lead battery 11 is a well-known general-purpose battery. For example, lead dioxide ($PbO_2$) is used as the positive electrode active material of the lead battery 11, and lead (Pb) is used as the negative electrode active material. Further, sulfuric acid ($H_2SO_4$) is used as the electrolyte. A plurality of battery cells constituted from these electrodes are series-connected to thereby constitute the lead battery 11. In the present embodiment, the power storage capacity of the lead battery 11 is set to be larger than the power storage capacity of the lithium ion battery 12.

In contrast, the lithium ion battery 12 is a battery that has less power loss during charging and discharging, and that has higher power density and energy density, compared with the lead battery 11. The lithium ion battery 12 may be a battery that has higher energy efficiency during charging and discharging than that of the lead battery 11. Moreover, compared with the lead battery 11, the lithium ion battery 12 has a smaller internal resistance value in an unused state (new product).

For example, an oxide containing lithium (lithium metal composite oxide) is used as the positive electrode active material of the lithium ion battery 12. Specific examples include $LiCoO_2$, $LiMn_2O_4$, $LiNiO_2$, $LiFePO_4$, and the like. Usable examples of the negative electrode active material of the lithium ion battery 12 include carbon (C), graphite, lithium titanate (e.g., $Li_xTiO_2$), an alloy containing Si or Su, and the like. An organic electrolyte is used as the electrolyte of the lithium ion battery 12. A plurality of battery cells constituted from these electrodes are series-connected to thereby constitute the lithium ion battery 12.

The batteries 11 and 12 have the same rated voltage, which is 12 V, for example. Reference signs 11a and 12a in FIG. 1 denote a battery cell assembly of the lead battery 11 and a battery cell assembly of the lithium ion battery 12, respectively, and reference signs 11b and 12b denote the internal resistance of the lead battery 11 and the internal resistance of the lithium ion battery 12, respectively.

Although detailed description with reference to drawings is omitted, the lithium ion battery 12 is housed in a housing case, and is constituted as a battery unit U integrated with a substrate. FIG. 1 shows the battery unit U surrounded by a broken line. The battery unit U has external terminals P0 and P1. Of these, the external terminal P0 is connected to the lead battery 11, the starter 13a, and the electrical load 13b, and the external terminal P1 is connected to the rotary electric machine 14.

The rotary electric machine 14 is a power generator with a function of a motor having a three-phase alternating current motor and an inverter as a power converter, and is configured as a mechanically and electrically integrated type Integrated Starter Generator (ISG). The rotary electric machine 14 is connected to an output shaft of the engine 10, and has a function of a power generation (regenerative power generation) to generate power by rotation of the output shaft of the engine 10 and/or the axle, and a function of a power running to apply a torque to the output shaft of the engine 10. Due to the function of the power running (power running drive) of the rotary electric machine 14, a torque is applied to the engine 10 that is automatically stopped during idling stop, when the engine 10 is restarted. Further, due to the function of the power running (power running drive) of the rotary electric machine 14, a torque is applied to assist the engine 10 during vehicle running. The rotary electric machine 14 supplies the generated power generated by regenerative power generation to each of the batteries 11 and 12.

The starter 13a is a starting device for starting the engine 10. When the starter 13a is switched on, the engine 10 is started by the power supplied from the lead battery 11.

The electrical load 13b has a constant voltage required load that is required to be stable so that the voltage of the supplied power is almost constant or varies at least within a predetermined range, and a general load other than the constant voltage load.

The electrical load 13b is described in detail below. The constant voltage required load includes a running load relevant to vehicle running, and a load other than the running load. Examples of the running load include braking devices, oil pumps for automatic transmissions, fuel pumps, electric power steering, and the like. Examples of the load other than the running load include navigation devices, display devices displaying meters, etc., audio devices, and the like. The general load has a wider operable voltage range than the constant voltage required load, and examples thereof include headlights, wipers on the front windshield etc., blower fans of air-conditioners, defroster heaters for the rear window shield, and the like.

Next, the battery unit U is described. The battery unit U is provided with, as electrical pathways in the unit, an electrical pathway L1 that connects the external terminals P0 and P1, and an electrical pathway L2 that connects a connection point N1 on the electrical pathway L1 and the lithium ion battery 12. Of these, the electrical pathway L1 is provided with a switch 21, and the electrical pathway L2 is provided with a switch 22. The generated power of the rotary electric machine 14 is supplied to the lead battery 11 and/or the lithium ion battery 12 through the electrical pathways L1 and/or L2.

The switch 21 is provided between the external terminal P0 and the connection point N1 on the electrical pathway from the lead battery 11 to the lithium ion battery 12; the connection point N1 is connected to the rotary electric machine 14. The switch 22 is located on the electrical pathway from the lead battery 11 to the lithium ion battery 12 to be closer to the lithium ion battery 12 than to the connection point P0.

In the electrical pathway L2, a current detector 15 is series-connected between the switch 22 and the lithium ion battery 12. The current detector 15 detects charge/discharge current I flowing through the lithium ion battery 12. Further, in the electrical pathway L2, a voltage detector 16 is connected in parallel to the lithium ion battery 12. The voltage detector 16 detects inter-terminal voltage V applied to the lithium ion battery 12.

Moreover, the lithium ion battery 12 is provided with a temperature sensor 17, and the temperature sensor 17 is configured to detect the temperature of the lithium ion battery 12.

The battery unit U comprises a control unit 50 as a control device for controlling the switches 21 and 22. The control unit 50 is constituted from a microcomputer including CPU, ROM, RAM, an input-output interface, etc.

The control unit 50 is connected to the current detector 15 and the voltage detector 16, and is configured to be able to acquire the charge/discharge current I and the inter-terminal voltage V of the lithium ion battery 12. Further, the control unit 50 is connected to the temperature sensor 17, and is configured to be able to acquire the temperature of the lithium ion battery 12.

Moreover, the control unit 50 controls each of the switches 21 and 22, etc., based on the storage state of each of the batteries 11 and 12, etc. Specifically, the control unit 50 calculates the SOC (state of charge) of the lithium ion battery 12 based on the charge/discharge current I and the inter-terminal voltage V of the lithium ion battery 12. Then, the control unit 50 controls each of the switches 21 and 22 to control the charge and discharge of the lead battery 11 and the lithium ion battery 12 so that the SOC is maintained within a predetermined working range. That is, the control unit 50 carries out charge and discharge selectively using the lead battery 11 and the lithium ion battery 12.

The control unit 50 is connected to, for example, ECU 61 comprising an engine ECU 61. ECU 61 is constituted from a microcomputer including CPU, ROM, RAM, an input-output interface, etc., and controls the engine 10 based on the operating state of the engine 10 and/or the vehicle running state. The control unit 50 and ECU 61 are connected through a communication network, such as CAN, so that they can communicate with each other, and various data stored in the control unit 50 and ECU 61 can be shared with each other.

ECU 61 carries out idling stop control, for example. In the idling stop control, as is well known, the engine 10 is automatically stopped when predetermined automatic stop conditions are satisfied, and the engine 10 is restarted when predetermined restart conditions are satisfied while the engine is in the automatic stop state. When ECU 61 restarts the engine 10, ECU 61 notifies the control unit 50 of the restart. When the restart is notified, the control unit 50 turns off (opens) the switch 22 and turns on (closes) the switch 21 to drive (power running drive) the rotary electric machine 14 by the power supplied from the lithium ion battery 12.

As described above, when the engine 10 is initially started in the power supply system comprising two power sources, i.e., the lead battery 11 and the lithium ion battery 12, the lead battery 11, which can output a high current at a stable voltage, is used. On the other hand, when the engine 10 is restarted from the automatic stop state of the engine 10 by idling stop control, the lithium ion battery 12, which has superior charge and discharge characteristics, is used, thereby suppressing early degradation of the lead battery 11, which is less resistant to frequent charge and discharge (accumulated charge and discharge).

If the lithium ion battery 12 is in a degraded state, power shortage of the lithium ion battery 12 may occur. That is, if the engine 10 enters an automatic stop state even though the lithium ion battery 12 is degraded and cannot supply power required for restart, there is a possibility that power is not appropriately supplied from the lithium ion battery 12 at the time of restart of the engine 10. When the power supply at the time of initial start of the engine 10 is performed by the lead battery 11, idling stop control may be implemented even though the lithium ion battery 12 is in a degraded state.

Accordingly, in the present embodiment, an internal resistance value Rs is calculated as a parameter indicating the state of degradation of the lithium ion battery 12, before the engine 10 is automatically stopped. An automatic stop permission is determined based on the calculated internal resistance value Rs. This is described in detail below.

The control unit 50 executes various functions by an acquisition unit 51 that acquires the charge/discharge current I and the inter-terminal voltage V of the lithium ion battery 12, a calculation unit 52 that calculates an internal resistance value Rs of the lithium ion battery 12, and a permission determination unit 53 that permits automatic stop depending on whether the engine 10 can be restarted by power running drive of the rotary electric machine 14 after the engine 10 enters an automatic stop state. Programs stored in the control unit 50 are executed, whereby the various functions are realized. The various functions may be realized by an electronic circuit, which is hardware; alternatively, at least some of the functions may be realized by software, i.e., processing executed on a computer.

When regenerative power generation is performed by the rotary electric machine 14 in association with the deceleration of the vehicle, the acquisition unit 51 acquires the charge/discharge current I detected by the current detector 15 and the inter-terminal voltage V detected by the voltage detector 16. The acquired charge/discharge current I and inter-terminal voltage V are stored in a storage unit 54. Then, the calculation unit 52 calculates an internal resistance value Rs using the acquired charge/discharge current I and inter-terminal voltage V of the lithium ion battery 12.

Figure 2A:
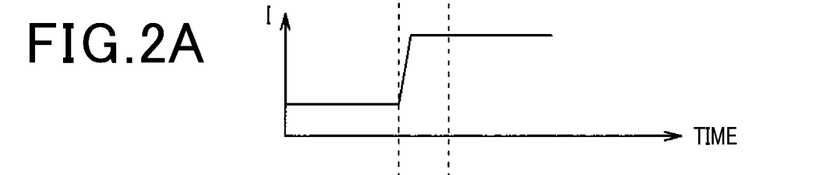
FIG. 2A is a schematic diagram showing the charge/discharge current and inter-terminal voltage in regenerative power generation.
Figure 2B:
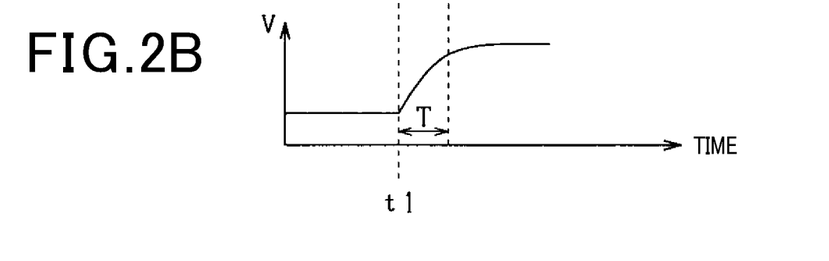
FIG. 2B is a schematic diagram showing the charge/discharge current and inter-terminal voltage in regenerative power generation.

Here, the method for calculating the internal resistance value Rs is described in more detail. When regenerative power generation is performed, a charge current flows into the lithium ion battery 12 from the rotary electric machine 14. Accordingly, the charge current of the lithium ion battery 12 changes steeply at the time of start of regenerative power generation (time t1), as shown in FIG. 2 (*a*). Further, as shown in FIG. 2 (*b*), the inter-terminal voltage V increases in association with the charge to the lithium ion battery 12, from the start time of regenerative power generation (time t1). At this time, the inter-terminal voltage V of the lithium ion battery 12 increases with a gradient depending on the size of the internal resistance value Rs of the lithium ion battery 12. Thus, the internal resistance value Rs of the lithium ion battery 12 can be obtained by monitoring changes in the inter-terminal voltage V.

Therefore, the calculation unit 52 acquires the charge/discharge current I and the inter-terminal voltage V detected within a predetermined time T, on the condition that the size of the charge/discharge current I changes from a predetermined first current to second current (the first current<the second current) within the predetermined time T. Then, the calculation unit 52 calculates the regression line based on the acquired charge/discharge current I and inter-terminal voltage V. The inclination of the regression line is regarded as the internal resistance value Rs. The control unit 50 then stores the calculated internal resistance value Rs in the storage unit 54 provided in the control unit 50.

The internal resistance values Rs are known to be affected by the size of the charge/discharge current I and the energization time. However, this influence is suppressed by thus calculating the internal resistance value Rs based on the charge/discharge current I and the inter-terminal voltage V acquired in the period in which the size of the charge/discharge current I changes from the predetermined first current to second current within the predetermined time.

The permission determination unit 53 determines whether automatic stop is permitted, based on the internal resistance value Rs stored in the storage unit 54. For example, the permission determination unit 53 calculates dischargeable power based on the internal resistance value Rs, and compares it with power required for restart, thereby determining whether restart can be appropriately executed. Then, the permission determination unit 53 permits automatic stop when restart can be appropriately executed, and prohibits automatic stop when restart cannot be appropriately executed.

The permission determination unit 53 may determine whether automatic stop is permitted, based on whether an internal resistance value Rs is less than a predetermined threshold, or whether the ratio of an internal resistance value Rs in an unused state and a current internal resistance value Rs is a predetermined value or more.

When automatic stop is permitted (when the lithium ion battery 12 is normal), the permission determination unit 53 permits subsequent idling stop control. On the other hand, when it is determined that restart is impossible (when the lithium ion battery 12 is degraded), the permission determination unit 53 prohibits subsequent idling stop control.

The internal resistance value Rs varies depending on, not only the degraded state of the lithium ion battery 12, but also changes in the SOC and/or temperature of the lithium ion battery 12. Therefore, when the SOC and/or temperature of the lithium ion battery 12 largely change(s) from those at the time of calculation of the internal resistance value Rs, an error may become large.

Figure 3:
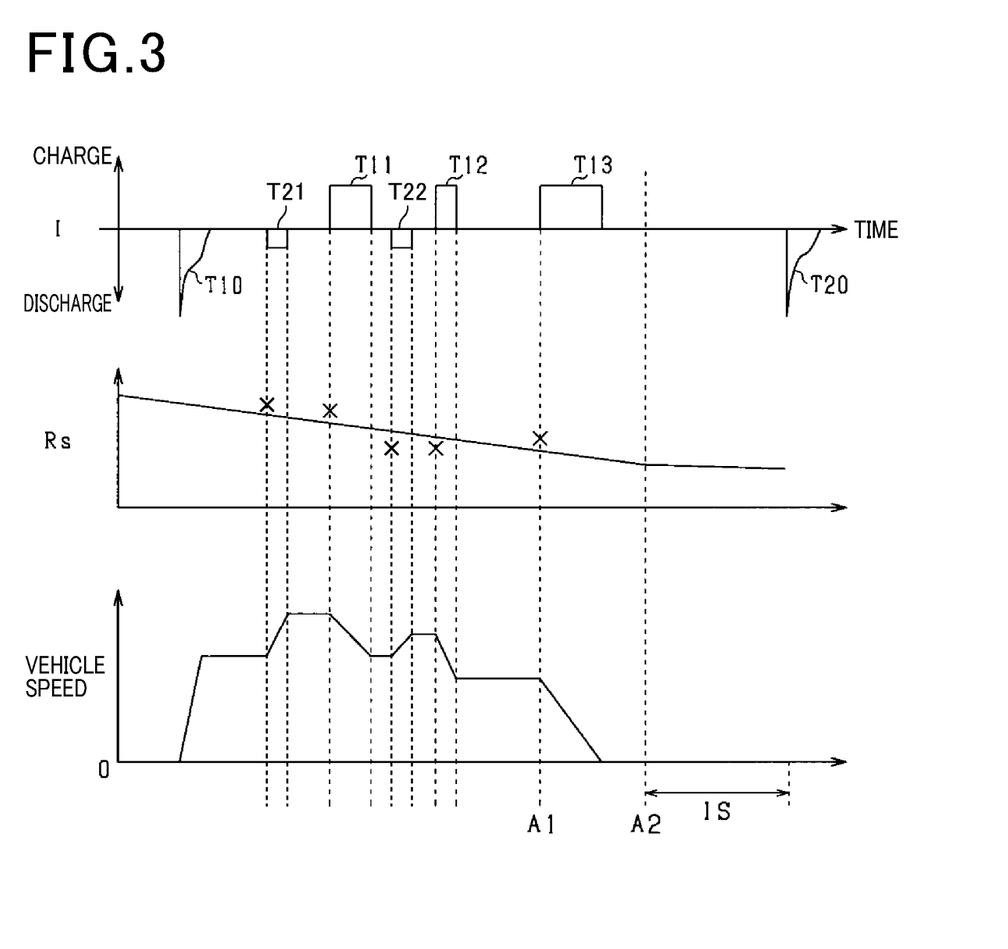
FIG. 3 is a schematic diagram showing the timing of regenerative power generation, and the transition of internal resistance values.

For example, as shown in FIG. 3, the vehicle generally repeats acceleration and deceleration after the restart of the engine 10 (period T10). After deceleration until the speed reaches zero (or a predetermined value near zero), the engine 10 enters an automatic stop state (period IS). It is considered that because deceleration and acceleration are repeated during vehicle running, the lithium ion battery 12 is charged and discharged, and SOC changes. Moreover, the temperature of the lithium ion battery 12 is also considered to change due to the influence of charge and discharge, outside air temperature, etc. Therefore, if the period from calculation of the internal resistance value Rs until the present time, i.e., until whether automatic stop is permitted is determined, is long, there is a possibility that the SOC and the temperature may greatly change, and that an error between the calculated internal resistance value Rs and the actual internal resistance value Rs increases. In FIG. 3, the actual internal resistance value Rs is shown by the solid line, and the calculated internal resistance values Rs are shown by the points.

As shown in FIG. 3, the period from the calculation timing of the internal resistance value Rs calculated in the deceleration period immediately before the engine enters an automatic stop state (regenerative power generation period T13) to the timing A2 of determining whether automatic stop is permitted is shorter than the period from the calculation timing of the internal resistance value Rs calculated in any deceleration period, which is before the deceleration period corresponding to the regenerative power generation period T13, to the permission determination timing A2. For example, the period from the calculation timing of the internal resistance value Rs calculated in the deceleration period corresponding to the regenerative power generation period T13 to the permission determination timing A2 is shorter than the period from the calculation timing of the internal resistance value Rs calculated in the first deceleration period corresponding to the regenerative power generation period T11 to the permission determination timing A2. Therefore, the detection accuracy of the internal resistance value Rs calculated in the regenerative power generation period T13 is higher than that of the previously calculated internal resistance value Rs.

Although it is possible to calculate the internal resistance value Rs based on the charge/discharge current I and the inter-terminal voltage V during power running drive (e.g., periods T10, T21, and T22), it is expected that the internal resistance value Rs calculated during regenerative power generation is more recent (newer) than the internal resistance value Rs calculated during power running drive. This is because the speed of the vehicle increases when power assistance (periods T21 and T22) or restart (period T10) is performed by power running drive of the rotary electric machine 14; thus, it is expected that a deceleration period occurs subsequently.

Accordingly, the permission determination unit 53 specifies the latest internal resistance value Rs among the internal resistance values Rs calculated at the time of each regenerative power generation (e.g., regenerative power generation periods T11 to T13), and determines an automatic stop permission based on the latest internal resistance value Rs. The latest internal resistance value Rs is an internal resistance value Rs calculated by the calculation unit 52 during regenerative power generation performed before the speed of the vehicle reaches zero or a predetermined value near zero or less during deceleration of the vehicle.

That is, the vehicle generally decelerates immediately before the engine enters an automatic stop state, i.e. immediately before the speed of the vehicle reaches zero or a predetermined value near zero or less. Because regenerative power generation is performed during this deceleration, the internal resistance value Rs calculated based on the current and voltage detected during this regenerative power generation is regarded as the latest internal resistance value Rs.

In the present embodiment, an internal resistance value Rs is calculated each time regenerative power generation is performed, and stored in the storage unit 54; thus, the latest one among the internal resistance values Rs stored in the storage unit 54 is specified as the latest internal resistance value Rs.

In this manner, the period from the time of calculation of the latest internal resistance value Rs until determination of an automatic stop permission being performed (the period from the time point A1 to the time point A2) is shortened. For example, when regenerative power generation is performed multiple times (when there are a plurality of deceleration periods i.e., regenerative power generation periods T11 to T13) before the engine enters an automatic stop state, the latest internal resistance value Rs is calculated during regenerative power generation immediately before the engine enters an automatic stop state (regenerative power generation period T13). Therefore, the period from the calculation timing of the internal resistance value Rs calculated in the deceleration period immediately before the engine enters an automatic stop state (regenerative power generation period T13) to the permission determination timing is shorter than the period from the calculation timing of the internal resistance value Rs calculated in any deceleration period, which is before the deceleration period corresponding to the regenerative power generation period T13, to the permission determination timing. Moreover, even if there is an opportunity for power running drive before the engine enters an automatic stop state, power running drive is used for acceleration, thus, power running drive is carried out before regenerative power generation immediately before the engine enters an automatic stop state. Therefore, the period from the time of calculation of the latest internal resistance value Rs until determination of an automatic stop permission, is shorter than, the period from the time of calculation of the internal resistance value Rs that can be calculated during power running drive until determination of an automatic stop permission.

Next, an execution example of the above processing is described. The processing of calculating the internal resistance value Rs is described based on FIG. 4. Calculation processing is performed by the control unit 50 for every predetermined period.

Figure 4:
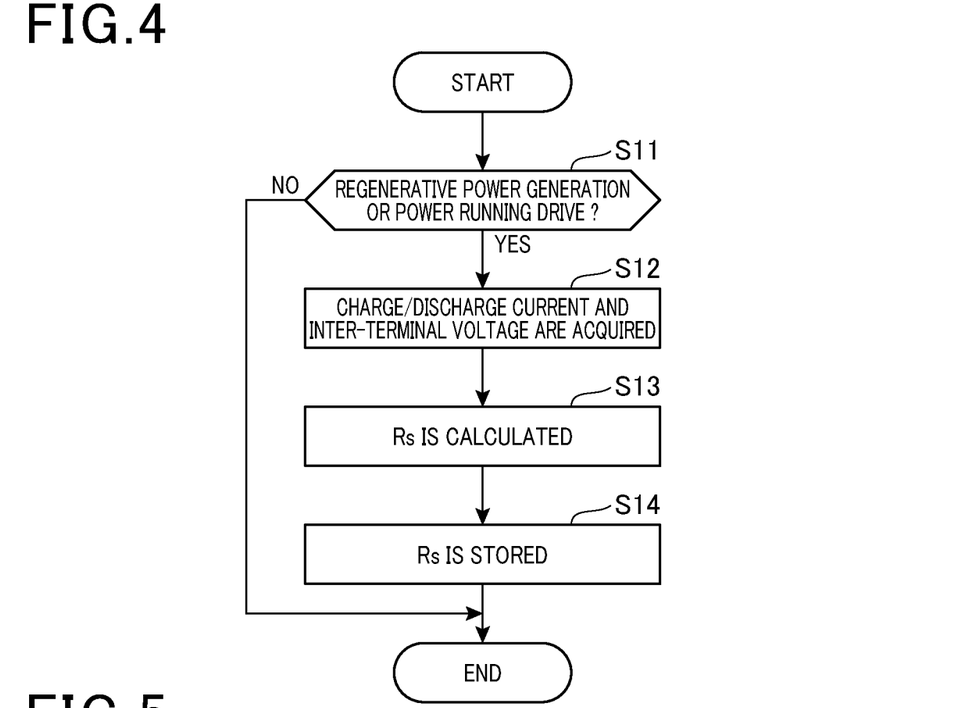
FIG. 4 is a flow chart showing calculation processing.

In FIG. 4, the control unit 50 determines whether regenerative power generation is being performed by the rotary electric machine 14 (step S11). Whether regenerative power generation has been performed by the rotary electric machine 14 can be determined from the detection results of the charge/discharge current I by the current detector 15. For example, the control unit 50 makes affirmable determination when the size of the charge/discharge current I has changed from a predetermined first current to a second current within a predetermined time T. Whether regenerative power generation is being performed may be determined based on a command i.e. a command indicating that regenerative power generation is being executed from ECU 61. When regenerative power generation is not being performed (step S11: NO), the control unit 50 terminates the calculation processing.

When regenerative power generation is being performed (step S11: YES), the control unit 50 acquires the charge/discharge current I and the inter-terminal voltage V of the lithium ion battery 12 (step S12). Then, the control unit 50 calculates an internal resistance value Rs based on the acquired charge/discharge current I and the inter-terminal voltage V of the lithium ion battery 12 (step S13). The control unit 50 stores the calculated internal resistance value Rs in the storage unit 54 (step S14), and terminates the calculation processing.

Figure 5:
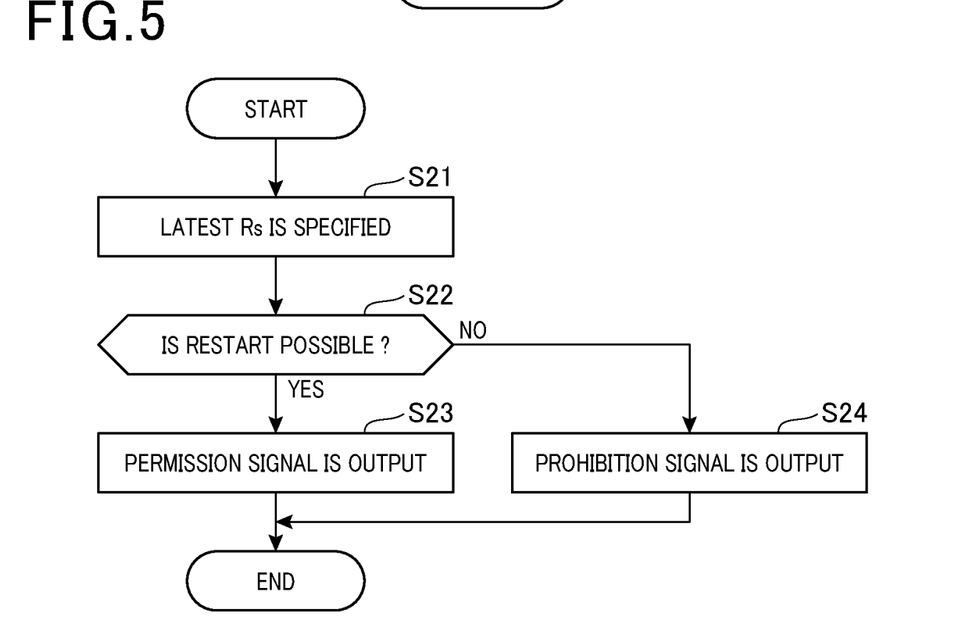
FIG. 5 is a flow chart showing determination processing.

The processing of determining whether automatic stop is permitted is described based on FIG. 5. The determination processing is executed when a new internal resistance value Rs is calculated. The determination processing may be executed for every predetermine period, or may be executed based on a command from ECU 61. The command from ECU 61 may be executed, for example, when automatic stop conditions are satisfied.

The control unit 50 specifies the latest internal resistance value Rs among the internal resistance values Rs stored in the storage unit 54 (step S21). Then, the control unit 50 determines whether restart is possible, based on the latest internal resistance value Rs (step S22). When restart is possible (step S22: YES), the control unit 50 outputs a permission signal to permit automatic stop to the ECU 61 (step S23). Then, the determination processing is terminated. When the permission signal is input, ECU 61 sets a permission flag on.

On the other hand, when restart is not possible (step S22: NO), the control unit 50 outputs a prohibition signal to prohibit automatic stop to ECU 61 (step S24). Then, the determination processing is terminated. When the prohibition signal is input, ECU 61 sets the permission flag off.

Figure 6:
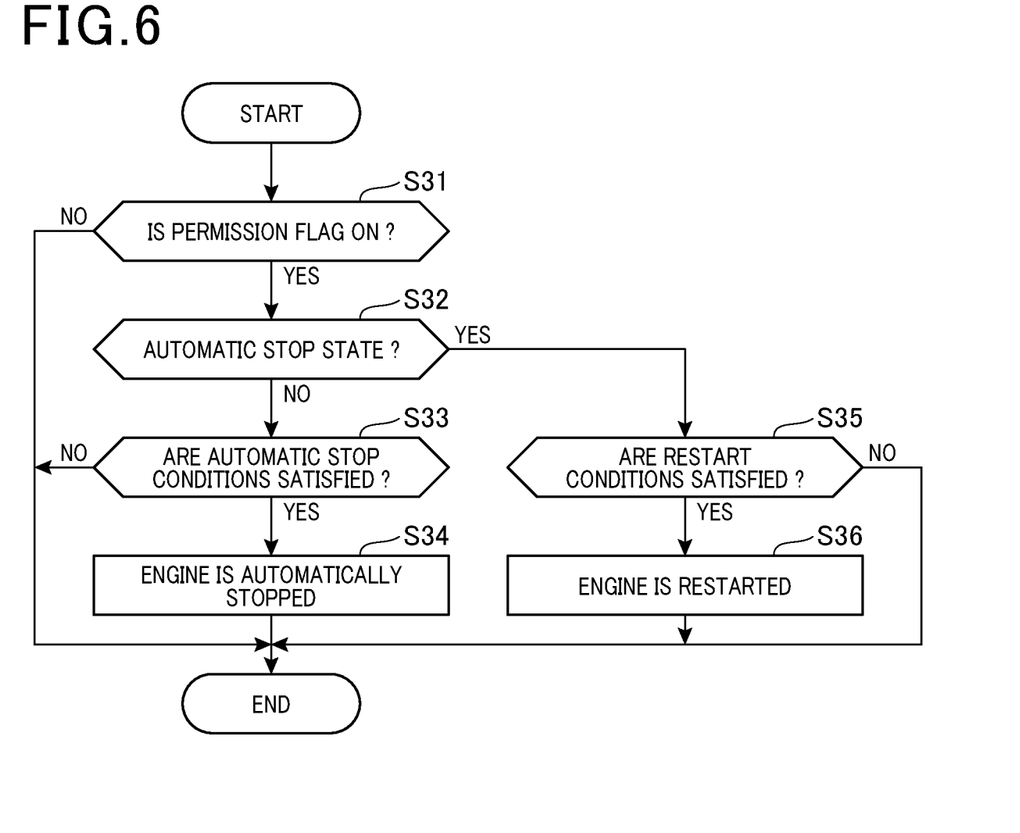
FIG. 6 is a flow chart showing idling stop processing.

An idling stop processing in connection with an idling stop control is described based on FIG. 6. The idling stop processing is executed by ECU 61 for every predetermined period.

ECU 61 determines whether the permission flag of an idling stop control is on (step S31). When the permission flag is on (step S31: YES), whether the engine 10 is in an automatic stop state by the idling stop control is determined (step S32). When the engine is not in an automatic stop state (step S32: NO), ECU 61 determines whether the automatic stop conditions of the engine 10 are satisfied (step S33). The automatic stop conditions include, for example, the speed of the vehicle reaching zero or a predetermined value near zero or less, and/or the accelerator being not operated for a predetermined period of time. When the automatic stop conditions are satisfied (step S33: YES), ECU 61 controls the engine 10 so that the engine is automatically stopped (step S34).

On the other hand, when it is determined that the engine is in an automatic stop state (step S32: YES), ECU 61 determines whether the restart conditions of the engine 10 are satisfied (step S35). The restart conditions are satisfied, for example, when the accelerator is operated. When the restart conditions are satisfied (step S35: YES), ECU 61 notifies the control unit 50 of restart, and controls the control unit 50 to supply power to the rotary electric machine 14 from the lithium ion battery 12 (step S36). Due to power supply, the rotary electric machine 14 is power running driven, and the engine 10 is restarted. When a negative determination is made in step S31, step S33, and step S35, the idling stop processing is terminated. When a NO determination is made in step S31, the idling stop control is not carried out.

According to the above, the following excellent effects can be exhibited.

There is generally a vehicle deceleration period before the engine 10 enters an automatic stop state, and regenerative power generation is performed in this deceleration period. Therefore, regarding the latest internal resistance value Rs among the internal resistance values Rs calculated during regenerative power generation before the engine 10 enters an automatic stop state, the change factors (time, temperature, SOC, etc.) of the internal resistance value Rs from the time of calculation are expected to be smaller than those of the internal resistance value Rs calculated during power running drive. Moreover, the change factors of the latest internal resistance value Rs from the time of calculation are expected to be smaller than those of the internal resistance value Rs calculated during previous regenerative power generation. That is, the detection accuracy of the latest internal resistance value Rs is expected to be higher than that of the internal resistance value Rs calculated during power running drive, or than that of the internal resistance value Rs calculated during previous regenerative power generation. Therefore, the accuracy of the determination of an automatic stop permission can be improved by determining the automatic stop permission based on the latest internal resistance value Rs.

When the speed of the vehicle reaches zero or a predetermined value near zero or less, one or more conditions of the automatic stop can be satisfied. Accordingly, regenerative power generation performed before the speed of the vehicle reaches a predetermined value or less during deceleration of the vehicle is considered to be regenerative power generation immediately before the engine enters an automatic stop state. The change factors of the internal resistance value Rs calculated during this regenerative power generation are expected to be smallest compared with those of internal resistance values Rs calculated in other opportunities. Therefore, detection accuracy can be increased by using this value as the latest internal resistance value Rs.

Second Embodiment

Figure 7:
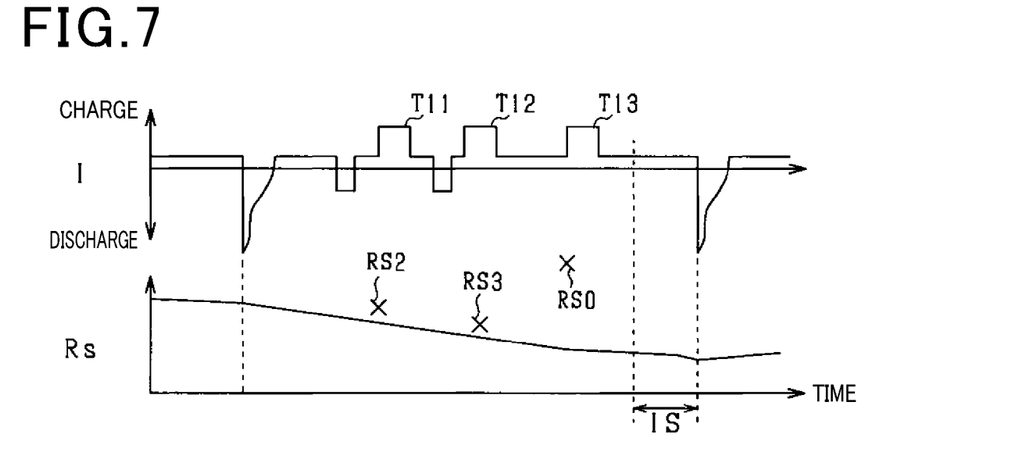
FIG. 7 is a schematic diagram showing the transition of internal resistance values in a second embodiment.

As shown in FIG. 7, when the latest internal resistance value Rs has a predetermined amount or more of error with respect to the previously calculated internal resistance value Rs, the automatic stop permission cannot be appropriately determined. Accordingly, in the second embodiment, when it is determined that the latest internal resistance value Rs has a predetermined amount or more of error, the permission determination unit 53 fails to permit automatic stop based on the latest internal resistance value Rs. This is described in detail below.

The control unit 50 specifies the latest internal resistance value Rs (internal resistance value Rs0 in FIG. 7) among the internal resistance values Rs stored in the storage unit 54. Then, when the latest internal resistance value Rs is separated by a predetermined distance or more from the regression line specified based on the history of internal resistance values, the control unit 50 determines that this latest internal resistance value Rs is not a suitable value for use in determination of an automatic stop permission. For example, in FIG. 7, when the latest internal resistance value Rs is separated by a predetermined distance or more from the regression line specified based on the history of internal resistance values (internal resistance values Rs2 and Rs3), the control unit 50 determines that the latest internal resistance value Rs0 is not a suitable value for use in determination of an automatic stop permission. The control unit 50 thereby functions as an error determination unit.

In this case, the permission determination unit 53 determines an automatic stop permission based on the previous internal resistance value Rs calculated immediately before the latest internal resistance value Rs among the internal resistance values Rs stored in the storage unit 54.

For example, in FIG. 7, the latest internal resistance value Rs0 is calculated in the regenerative power generation period T13 immediately before the engine enters an automatic stop state. In contrast, the previous internal resistance value Rs3 calculated before the latest internal resistance value Rs0 is calculated in previous regenerative power generation period T12 before regenerative power generation immediately before the engine enters an automatic stop state. In FIG. 7, the actual internal resistance value Rs is shown by the solid line, and the calculated internal resistance values Rs are shown by the points.

When the previously calculated internal resistance value Rs (internal resistance value Rs3 in FIG. 7) immediately before the latest internal resistance value has a predetermined amount or more of error with respect to any internal resistance value Rs calculated before the previously calculated internal resistance value Rs (internal resistance value Rs3), the permission determination process may be carried out based on the internal resistance value Rs (internal resistance value Rs2 in FIG. 7) calculated immediately before the previously calculated internal resistance value Rs (internal resistance value Rs3).

Figure 8:
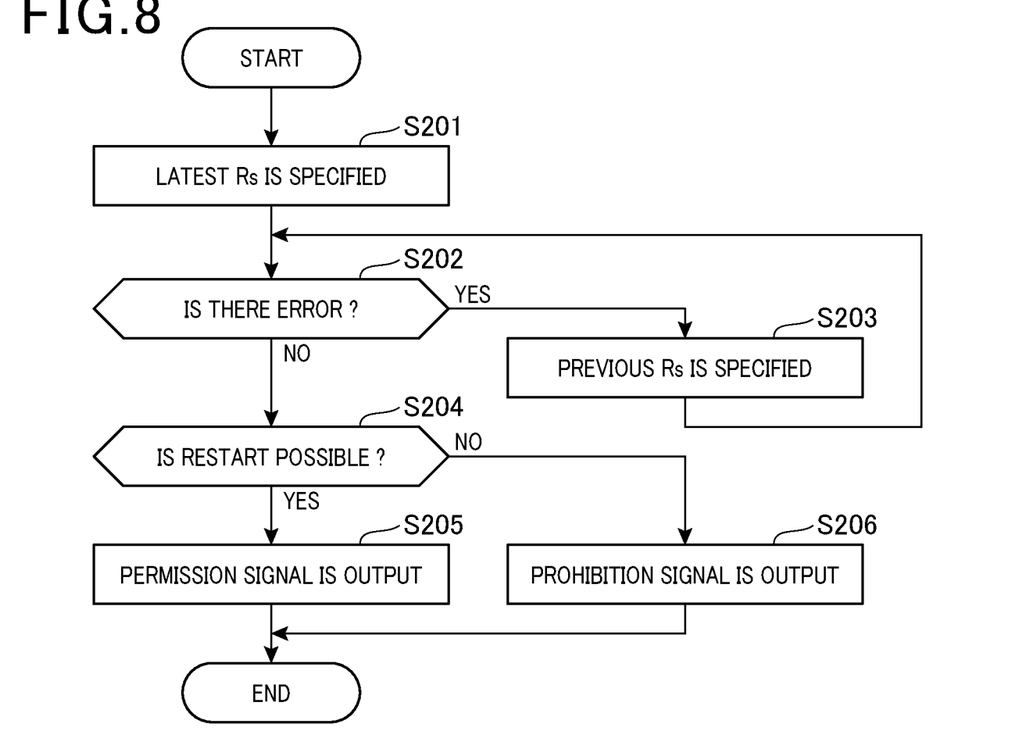
FIG. 8 is a flow chart showing the determination processing of the second embodiment.

Next, determination processing in the second embodiment is described based on FIG. 8. The control unit 50 specifies the latest internal resistance value Rs among the internal resistance values Rs stored in the storage unit 54 (step S201). Next, the control unit 50 determines whether the specified internal resistance value Rs has a predetermined amount or more of error (step S202). Specifically, it is determined whether there is a predetermined amount or more of error, based on whether the latest internal resistance value Rs is separated by a predetermined distance or more from the regression line specified based on internal resistance values Rs before the specified internal resistance value Rs.

When there is a predetermined amount or more of error (step S202: YES), the control unit 50 specifies the previous internal resistance value Rs calculated before the latest internal resistance value Rs among the internal resistance values Rs stored in the storage unit 54 (step S203). Then, the control unit 50 moves to step S202, and determines whether the specified internal resistance value Rs has a predetermined amount or more of error in the same manner as described above.

When there is no predetermined amount or more of error (step S202: NO), the control unit 50 determines whether restart is possible, based on the specified internal resistance value Rs (step S204). When restart is possible (step S204: YES), the control unit 50 outputs a permission signal to permit automatic stop to ECU 61 (step S205). In contrast, when restart is not possible (step S204: NO), the control unit 50 outputs a prohibition signal to prohibit automatic stop to ECU 61 (step S206).

According to the above, the following excellent effects can be exhibited.

When the latest internal resistance value Rs has a predetermined amount or more of error, there is a possibility of erroneous detection, which is not suitable for the permission determination. Accordingly, when the latest internal resistance value Rs has a predetermined amount or more of error, the automatic stop is not permitted based on the latest internal resistance value Rs.

Specifically, the permission determination unit 53 is configured to determine the automatic stop permission based on the previous internal resistance value Rs calculated before the latest internal resistance value Rs among the internal resistance values Rs stored in the storage unit 54. The automatic stop permission is thereby determined based on, not only the latest internal resistance value Rs, but also a plurality of internal resistance values calculated before the latest one; thus, determination accuracy can be improved. That is, determination accuracy can be improved even if the latest internal resistance value Rs has a predetermined amount or more of error.

Third Embodiment

The internal resistance value Rs of the lithium ion battery 12 may vary depending on the state change of the lithium ion battery 12. For example, this value may vary when the SOC or temperature of the lithium ion battery 12 changes. Therefore, when the period from the time of calculation of the latest internal resistance value Rs to the determination of an automatic stop permission is long, the error between the actual internal resistance value Rs and the calculated internal resistance value Rs may increase due to the changes in SOC and temperature during this period. In this case, the automatic stop permission may not be appropriately determined.

Accordingly, the permission determination unit 53 of the third embodiment corrects the internal resistance value Rs used for the determination of the automatic stop permission, based on the state change of the lithium ion battery 12 from the time of calculation of the internal resistance value Rs to the present time (at the time of permission determination), and determines the automatic stop permission based on the corrected internal resistance value Rs. This is described in detail below.

When an internal resistance value Rs is calculated, the control unit 50 stores the state at the time of calculation in the storage unit 54 in association with the internal resistance value Rs (step S14 of FIG. 4). The state at the time of calculation includes, for example, the SOC of the lithium ion battery 12 at the time of calculation, and/or the temperature of the lithium ion battery 12 at the time of calculation.

Figure 10:
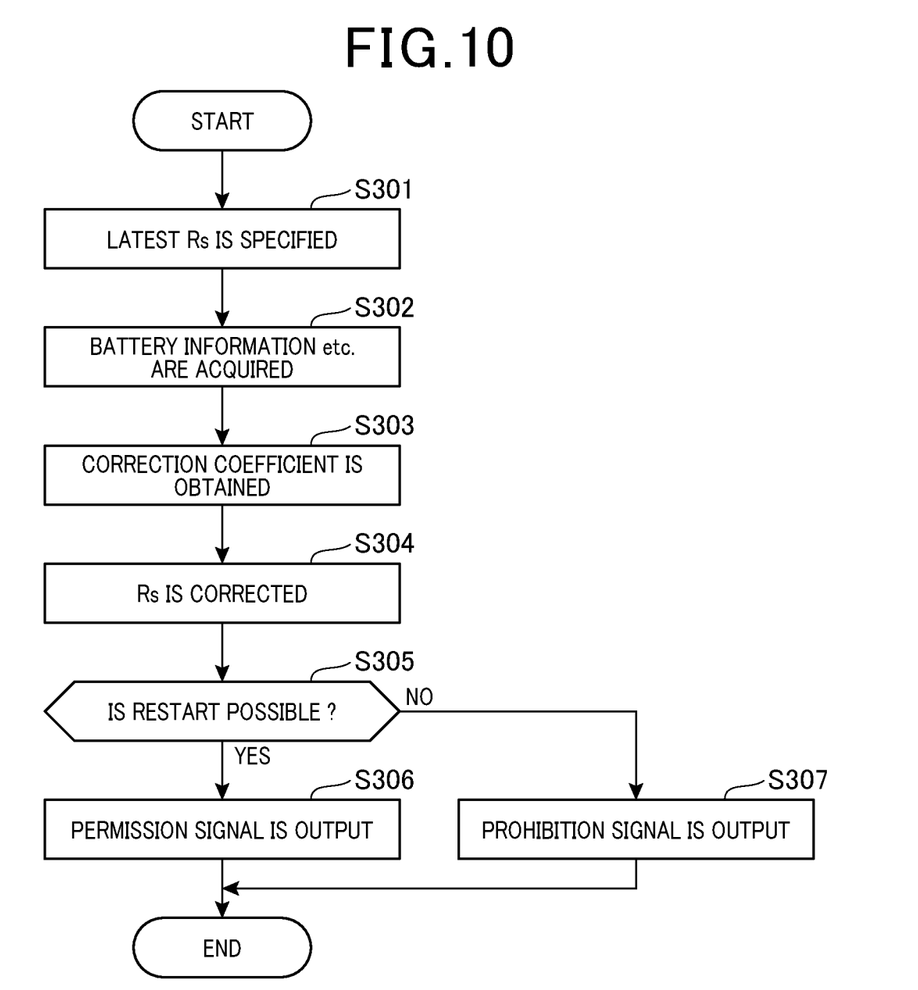
FIG. 10 is a flow chart showing the determination processing of a third embodiment.

Next, the determination processing in the third embodiment is described based on FIG. 10. The control unit 50 specifies the latest internal resistance value Rs among the internal resistance values Rs stored in the storage unit 54 (step S301). Next, the control unit 50 acquires the battery information of the lithium ion battery 12 at the time of calculation of the latest internal resistance value Rs, and at the time of permission determination (step S302).

Specifically, the control unit 50 acquires SOC and temperature as the battery information at the time of calculation of the latest internal resistance value Rs, from the state at the time of calculation stored in association with the latest internal resistance value Rs. Together with these, the control unit 50 acquires SOC and temperature at the time of permission determination (present time) as the battery information at the time of permission determination.

Then, the control unit 50 acquires a correction coefficient based on the battery information of the lithium ion battery 12 (step S302). Specifically, in step S302, the control unit 50 first compares SOC at the time of calculation with SOC at the time of permission determination, and specifies variation between them. That is, the control unit 50 subtracts SOC at the time of calculation from SOC at the time of permission determination, and specifies the difference between them as the variation of SOC. For example, what percent of SOC changes is specified. When SOC at the time of permission determination is smaller than SOC at the time of calculation (when SOC is reduced), a negative value is taken.

Similarly, the control unit 50 subtracts the temperature of the lithium ion battery 12 at the time of calculation from the temperature at the time of permission determination, and specifies the difference between them as the variation of temperature. For example, the degree of temperature change is specified. When the temperature at the time of permission determination is smaller than the temperature at the time of calculation (when the temperature is reduced), a negative value is used.

Figure 9:
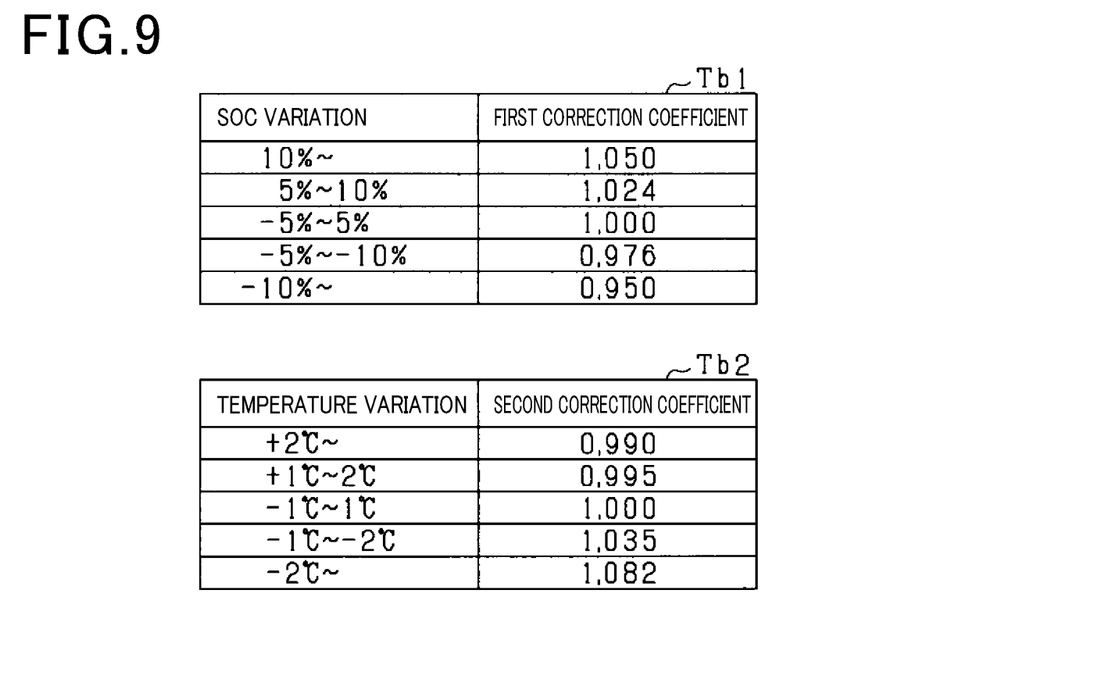
FIG. 9 is a set of schematic diagrams showing correction tables used to correct internal resistance values.

Then, the control unit 50 acquires a correction coefficient to be multiplied with the internal resistance value Rs depending on the specified variation. Specifically, the storage unit 54 stores a correction table Tb1 that associates the variation of SOC with a first correction coefficient, and a correction table Tb2 that associates the variation of temperature with a second correction coefficient, as shown in FIG. 9. The control unit 50 acquires the first correction coefficient depending on the variation of SOC with reference to the correction table Tb1, and acquires the second correction coefficient depending on the variation of temperature with reference to the correction table Tb2.

For example, when the variation of SOC is −6% (between −5% to −10%), 0.976 is specified as the first correction coefficient with reference to the correction table Tb1. Similarly, when the variation of temperature is +1.5° C. (between 1° C. to 2° C.), "0.995" is specified as the second correction coefficient. The correction tables Tb1 and Tb2 are created based on experimental values etc., and are stored in the storage unit 54. Moreover, the correction tables Tb1 and Tb2 in FIG. 9 are examples, and the range of variation and the correction coefficients may be suitably changed.

Then, the control unit 50 corrects the latest internal resistance value Rs based on the acquired correction coefficients (step S304). Specifically, the control unit 50 corrects the internal resistance value Rs by multiplying the latest internal resistance value Rs by the first correction coefficient or the second correction coefficient.

Then, the control unit 50 determines whether restart is possible, based on the corrected internal resistance value Rs (step S305). When restart is possible (step S305: YES), the control unit 50 outputs a permission signal to permit automatic stop to ECU 61 (step S306). In contrast, when restart is not possible (step S305: NO), the control unit 50 outputs a prohibition signal to prohibit automatic stop to ECU 61 (step S307).

According to the above, the following excellent effects can be exhibited.

Even if the state of the lithium ion battery 12 changes, the error between the internal resistance value Rs at the time of calculation and the actual internal resistance value Rs at the time of permission determination increases, correction is made to reduce the error between the internal resistance values Rs depending on the state of the lithium ion battery 12. That is, even if the SOC and temperature of the lithium ion battery 12 change from those at the time of calculation, the latest internal resistance value Rs is corrected based on the variations of SOC and temperature at the time of permission determination to reduce the error with the actual internal resistance value Rs. The accuracy of the determination of an automatic stop permission can be thereby improved.

Fourth Embodiment

The internal resistance value Rs of the lithium ion battery 12 may vary depending on the state change of the lithium ion battery 12. For example, the internal resistance value Rs may vary when the SOC or temperature of the lithium ion battery 12 changes. Therefore, when the period from the time of calculation of the latest internal resistance value Rs to determination of an automatic stop permission is long, the error between the actual internal resistance value Rs and the calculated internal resistance value Rs may increase due to the changes in SOC and temperature during this period. In this case, the automatic stop permission may not be appropriately determined.

Accordingly, the permission determination unit 53 of the fourth embodiment does not permit the implementation of automatic stop when it is determined that the state change of the lithium ion battery 12 is equal to or more than a predetermined amount. This is described in detail below.

When an internal resistance value Rs has been calculated, the control unit 50 stores the state at the time of calculation in association with the internal resistance value Rs in the storage unit 54 (step S14 of FIG. 4). The state at the time of calculation includes, for example, the SOC of the lithium ion battery 12 at the time of calculation, and/or the temperature of the lithium ion battery 12 at the time of calculation. Further, the state at the time of calculation includes, for example, the time of calculation.

Figure 11:
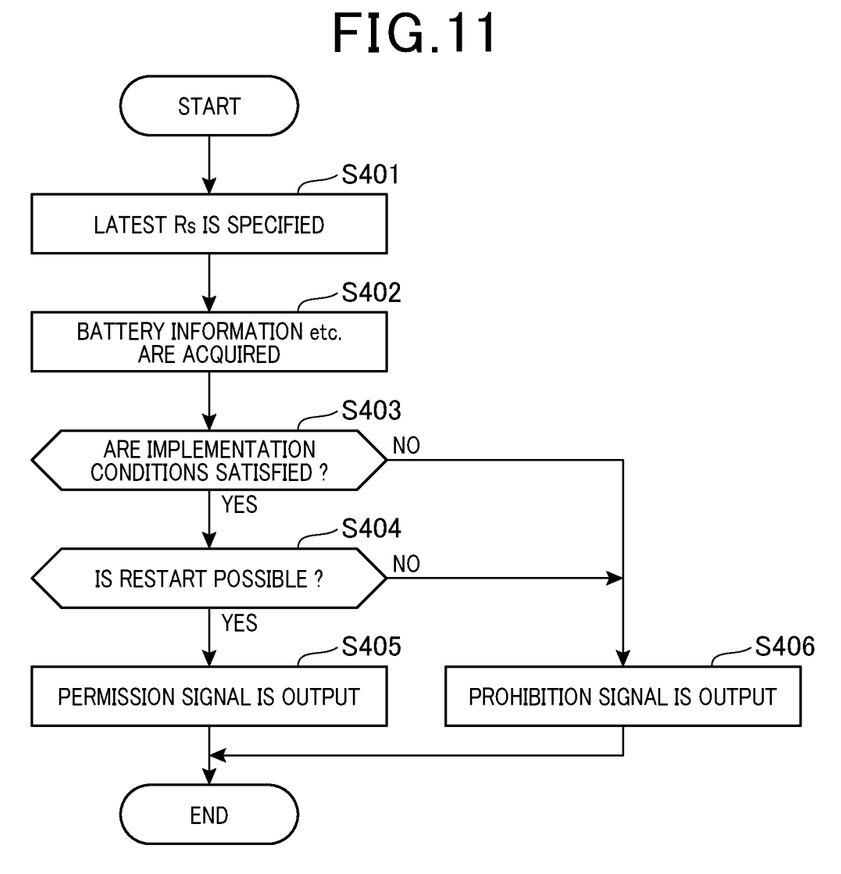
FIG. 11 is a flow chart showing the determination processing of a fourth embodiment.

Next, a determination processing in the fourth embodiment is described based on FIG. 11. The control unit 50 specifies the latest internal resistance value Rs from the internal resistance values Rs stored in the storage unit 54 (step S401). Next, the control unit 50 acquires the battery information of the lithium ion battery 12 at the time of calculation of the latest internal resistance value Rs, and at the time of permission determination (step S402).

Specifically, the control unit 50 acquires SOC and temperature as the battery information at the time of calculation of the latest internal resistance value Rs, from the state at the time of calculation stored in association with the latest internal resistance value Rs. Further, the control unit 50 specifies the time of calculation of the latest internal resistance value Rs. Together with these, the control unit 50 acquires SOC and temperature at the time of permission determination (present time) as battery information at the time of permission determination. Moreover, the control unit 50 specifies the present time at the time of permission determination.

Then, the control unit 50 determines whether the implementation conditions that should be satisfied when automatic stop is permitted are satisfied (step S403). Specifically, in step S403, the control unit 50 first compares SOC at the time of calculation of the latest internal resistance value Rs with SOC at the time of permission determination, and obtains variation between them. That is, the control unit 50 subtracts SOC at the time of calculation from SOC at the time of permission determination, and obtains the difference between them as the variation of SOC. For example, what percent of SOC changes is specified. When SOC at the time of permission determination is smaller than SOC at the time of calculation (when SOC is reduced), a negative value is taken.

Similarly, the control unit 50 subtracts the temperature of the lithium ion battery 12 at the time of calculation from the temperature at the time of permission determination, and obtains the difference between them as the variation of temperature. For example, what degree of temperature changes is specified. When the temperature at the time of permission determination is smaller than the temperature at the time of calculation (when the temperature is reduced), a negative value is taken. Moreover, the control unit 50 obtains the elapsed time from the time of calculation based on the time of calculation and the time of permission determination.

Then, the control unit 50 determines whether the state change of the lithium ion battery 12 from the time of calculation of the latest internal resistance value Rs to the time of permission determination is equal to or more than a predetermined amount. Specifically, when the elapsed time is equal to or more than a predetermined time (e.g., 2 minutes), the control unit 50 determines that the state change of the lithium ion battery 12 is equal to or more than a predetermined amount. Moreover, when the variation of the SOC of the lithium ion battery 12 is equal to or more than a predetermined value (e.g., 10%) (when the change in the state of charge is equal to or more than a predetermined amount), the control unit 50 determines that the state change is equal to or more than a predetermined amount. Furthermore, when the variation of the temperature of the lithium ion battery 12 is equal to or more than a predetermined value (e.g., 0.5° C.), the control unit 50 determines that the state change is equal to or more than a predetermined amount. In contrast, when the elapsed time is less than a predetermined time, the variation of SOC is less than a predetermined value, and the variation of temperature is less than a predetermined value, it is determined that the state change is not equal to or more than a predetermined amount. The control unit 50 thereby functions as a state determination unit.

Then, when it is determined that the state change of the lithium ion battery 12 is not equal to or more than a predetermined amount, the permission determination unit 53 determines that the implementation conditions are satisfied. When it is determined that the implementation conditions are satisfied (step S403: YES), the control unit 50 determines whether restart is possible, based on the latest internal resistance value Rs (step S404). When restart is possible (step S404: YES), the control unit 50 outputs a permission signal to permit automatic stop to ECU 61 (step S405). In contrast, when restart is not possible (step S404: NO), the control unit 50 outputs a prohibition signal to prohibit automatic stop to ECU 61 (step S406).

In contrast, when it is determined that the state change of the lithium ion battery 12 is equal to or more than a predetermined amount, the permission determination unit 53 determines that the implementation conditions are not satisfied. When it is determined that the implementation conditions are not satisfied (step S403: NO), the control unit 50 outputs a prohibition signal to prohibit automatic stop to ECU 61 (step S406).

According to the above, the following excellent effects can be exhibited.

When the state of the lithium ion battery 12 changes, and the error of the internal resistance value Rs increases, automatic stop is uniformly not permitted. That is, when the elapsed time is equal to or more than a predetermined time (e.g., 2 minutes), the latest internal resistance value Rs may have an error from the actual internal resistance value Rs. Similarly, when the variation of the SOC of the lithium ion battery 12 is equal to or more than a predetermined value (e.g., 10%), the latest internal resistance value Rs may have an error from the actual internal resistance value Rs. Similarly, when the variation of the temperature of the lithium ion battery 12 is equal to or more than a predetermined value (e.g., 0.5 degrees), the latest internal resistance value Rs may have an error from the actual internal resistance value Rs. Accordingly, in these cases, automatic stop is not permitted because there is a possibility that restart cannot appropriately be carried out. This makes it possible to reliably avoid the situation in which restart cannot be achieved due to power shortage after automatic stop.

Moreover, due to traffic congestion etc, automatic stop can be prohibited exceptionally after start (restart) of the engine 10, when there is no opportunity for regenerative power generation before the engine enters an automatic stop state.

Other Embodiments

The present disclosure is not limited to the above embodiments, and may be carried out, for example, in the following manner. In the following, the same reference signs are assigned to the same or equivalent portions in each embodiment, and the description of the portions with the same reference signs is applied by reference.

In the above embodiments, the control unit 50 may determine an automatic stop permission based on the average value of a plurality of internal resistance values Rs including the latest internal resistance value Rs.

In the above embodiments, when an internal resistance value Rs is calculated, the control unit 50 may reflect the current internal resistance value Rs at a predetermined smoothed rate using the previous internal resistance value Rs, and the resulting value may be used as the internal resistance value Rs.

In the above second embodiment, when the error is equal to or more than a predetermined amount, the control unit 50 may reflect the current internal resistance value Rs at a predetermined smoothed rate on the previous internal resistance value Rs, and the resulting value may be used as the internal resistance value Rs.

In the above second embodiment, when the error is equal to or more than a predetermined amount, the control unit 50 determines an automatic stop permission based on the previous internal resistance value Rs before the latest internal resistance value; however, automatic stop may be prohibited. Moreover, for example, when the state change of the lithium ion battery 12 from the time of calculation of the previous internal resistance value Rs before the latest internal resistance value to the present time is equal to or more than a predetermined amount, automatic stop may be prohibited.

In the above second embodiment, when the error is equal to or more than a predetermined amount, the control unit 50 may determine an automatic stop permission based on the average value of a plurality of internal resistance values Rs including the latest internal resistance value Rs.

In the above second embodiment, in addition to the processing of step S202 in FIG. 4, or in place of the processing of step S202, the control unit 50 may determine whether polarization occurs in the lithium ion battery 12 at the time of implementation of regenerative power generation. Whether polarization occurs in the lithium ion battery 12 is determined by, for example, whether there is a predetermined energization history. About the predetermined energization history, for example, when the charge/discharge current I equal to or more than a predetermined threshold (e.g., 30 A) flows for a predetermined period of time (e.g., 3 seconds), it is determined that there is a predetermined energization history. In this case, the control unit 50 functions as a polarization determination unit.

When there is a predetermined energization history, there is a possibility that polarization occurs in the lithium ion battery 12. Then, when polarization occurs in the lithium ion battery 12, even if the internal resistance value Rs is calculated based on the charge/discharge current I and the inter-terminal voltage V during this regenerative power generation, the error is likely to increase, which is not suitable for permission determination. Accordingly, when polarization occurs in the lithium ion battery 12, automatic stop may not be permitted based on the internal resistance value Rs calculated during this regenerative power generation. In this case, the control unit 50 may perform the processing of step S203, as in the second embodiment, or may uniformly prohibit automatic stop.

In the above third embodiment, a correction table may be provided for each state at the time of calculation. For example, different correction tables may be provided for a case where SOC at the time of calculation is 80%, and for a case where SOC at the time of calculation is 60%. Moreover, different correction tables may be provided for a case where the temperature at the time of calculation is 0° C., and for a case where the temperature at the time of calculation is 25° C.

In the above embodiments, the internal resistance value Rs may be calculated based on the charge/discharge current I and the inter-terminal voltage V detected during power running drive. Moreover, an average value or smoothed value may be calculated including the internal resistance value Rs calculated during power running drive. Moreover, in the second embodiment, the internal resistance value Rs calculated during power running drive may be employed as the previous internal resistance value Rs before the latest internal resistance value Rs.

In the above embodiments, the latest internal resistance value Rs may be selected from the internal resistance values Rs calculated based on the charge/discharge current I and the inter-terminal voltage V detected during power running drive.

In the above third embodiment, automatic stop may not be permitted when the variation between the corrected internal resistance value Rs and the latest internal resistance value Rs is equal to or more than a predetermined threshold. The predetermined threshold in this case may be set, for example, based on the difference between the latest internal resistance value Rs and an internal resistance value Rs that allows appropriate restart.

In the above third embodiment, the latest internal resistance value Rs may be selected from the internal resistance values Rs calculated based on the charge/discharge current I and the inter-terminal voltage V detected during power running drive, automatic stop may not be permitted when the variation between the latest internal resistance value Rs and the corrected internal resistance value Rs is equal to or more than a predetermined threshold.

In the above fourth embodiment, when it is determined that the state change of the lithium ion battery 12 is equal to or more than a predetermined amount when the engine 10 is in an automatic stop state, the control unit 50 may notify ECU 61 of that, and may restart the engine 10.

In the above embodiments, the control unit 50 determines an automatic stop permission based on the latest internal resistance value Rs; however, in place of the control unit 50, ECU 61 may determine permission based on the latest internal resistance value Rs. In this case, the control unit 50 notifies ECU 61 of the calculated internal resistance value Rs.

The present disclosure is described according to embodiments; however, it is understood that the present disclosure is not limited to the embodiments and configurations. The present disclosure also includes various modified examples and modifications within an equivalent range. In addition, various combinations and configurations, and other combinations and configurations including more, less, or only a single element, are also within the spirit and scope of the present disclosure.

What is claimed is:

1. A control device that is applied to a power supply system mounted in a vehicle in which an engine is automatically stopped and restarted, wherein the power supply system includes a battery connected to a rotary electric machine that is connected to an output shaft of the engine and that has (i) a function of a regenerative power generation by way of rotation of at least one of the output shaft of the engine and an axle of the vehicle and (ii) a function of a power running drive by applying a torque to the output shaft of the engine, the control device comprising:
   an acquisition unit that acquires a current to or from the battery and a voltage of the battery;
   a calculation unit that calculates, after starting of the engine and before the engine enters an automatic stop state, an internal resistance value of the battery, which is based on (i) the current to or from the battery and (ii) the voltage of the battery, each time at least one of the regenerative power generation and the power running drive is performed by the rotary electric machine so as to accordingly calculate a plurality of the internal resistance values; and
   a permission determination unit that determines whether to permit an automatic stop of the engine depending on whether restarting of the engine is enabled based on the power running drive of the rotary electric machine, wherein
   the permission determination unit determines whether to permit the automatic stop of the engine based on a latest one of the plurality of internal resistance values calculated by the calculation unit.

2. The control device according to claim 1, wherein
   one or more conditions of the automatic stop include a speed of the vehicle reaching a predetermined value or less; and
   the latest one of the internal resistance values calculated by the calculation unit is a selected one of the plurality of internal resistance values that is calculated by the calculation unit during at least one of the regenerative power generation and the power running drive performed before the speed of the vehicle reaches the predetermined value or less during deceleration of the vehicle.

3. The control device according to claim 1, wherein
   the control device comprises an error determination unit that determines whether the latest one of the internal resistance values has a predetermined amount or more of error with respect to a selected value of the plurality of internal resistance values, the selected value of the plurality of internal resistance values being calculated before the latest one of the internal resistance values; and
   when it is determined that the latest one of the internal resistance values has the predetermined amount or more of error, the permission determination unit fails to permit the automatic stop of the engine based on the latest one of the internal resistance values.

4. The control device according to claim 1, wherein
   the control device comprises a polarization determination unit that determines whether a polarization has occurred in the battery during execution of the regenerative power generation; and
   when it is determined that the polarization has occurred during execution of the regenerative power generation when the latest one of the internal resistance values is calculated, the permission determination unit fails to permit the automatic stop of the engine based on the latest one of the internal resistance values.

5. The control device according to claim 1, wherein
   the permission determination unit determines whether to permit the automatic stop of the engine based on the plurality of internal resistance values calculated by the calculation unit.

6. The control device according to claim 5, wherein
   the permission determination unit calculates an average value or smoothed value of the plurality of internal resistance values calculated by the calculation unit, and determines whether to permit the automatic stop of the engine based on the calculated average value or smoothed value.

7. The control device according to claim 1, wherein
   the permission determination unit corrects the latest one of the internal resistance values used for determination of whether to permit the automatic stop of the engine, based on a state change of the battery from a time of calculation of the latest one of the internal resistance values to a present time, and determines whether to permit the automatic stop of the engine based on the corrected latest one of the internal resistance values.

8. The control device according to claim 1, wherein
   the control device comprises a state determination unit that determines whether a state change of the battery from a time of calculation of the latest one of the internal resistance values used for determination of whether to permit the automatic stop of the engine to a present time is equal to or more than a predetermined amount; and
   when it is determined that the state change of the battery is equal to or more than the predetermined amount, the permission determination unit fails to permit the automatic stop of the engine.

9. The control device according to claim 8, wherein
   the state determination unit determines that the state change of the battery is equal to or more than the predetermined amount based on at least one of the following:
   an elapsed time from the time of calculation of the latest one of the internal resistance values used for determination of whether to permit the automatic stop of the engine to the present time is equal to or more than a predetermined time;
   a temperature change of the battery is equal to or more than a predetermined temperature; and
   a change in a state of charge of the battery is equal to or more than a predetermined amount.

* * * * *